United States Patent [19]
Schulze

[11] 3,797,364
[45] Mar. 19, 1974

[54] FOLLOW-UP CONTROL APPARATUS

[75] Inventor: Eckehart Schulze, Rutesheim, Germany

[73] Assignee: Hartmann & Lammle OHG, Stuttgart-Bad, Cannstatt, Germany

[22] Filed: Dec. 16, 1971

[21] Appl. No.: 208,761

[30] Foreign Application Priority Data
Dec. 17, 1970  Germany............................ 2062134

[52] U.S. Cl. .................. 91/35, 91/380, 91/382, 137/636
[51] Int. Cl. .................. F15b 21/02, F15b 9/10
[58] Field of Search ............ 91/380, 382, 1, 35; 137/596, 596.17, 636

[56] References Cited
UNITED STATES PATENTS

| | | | |
|---|---|---|---|
| 3,428,143 | 2/1969 | King | 91/380 |
| 2,054,346 | 9/1936 | Sittert | 137/636 |
| 2,222,704 | 11/1940 | Brown | 137/636 |
| 2,980,139 | 4/1961 | Lynn | 251/282 |
| 2,910,967 | 11/1959 | Rosebrook | 91/380 |
| 3,530,764 | 9/1970 | Tomita | 91/380 |
| 3,516,333 | 6/1970 | Jackson | 91/380 |
| 3,621,762 | 11/1971 | Ihebe et al. | 91/380 |
| 3,180,234 | 4/1965 | Crawley | 92/5 |

Primary Examiner—Edgar W. Geoghegan
Assistant Examiner—A. M. Zupcic
Attorney, Agent, or Firm—Michael S. Striker

[57] ABSTRACT

A power amplifying follow-up control apparatus which has a fluid-operated prime mover whose output element can perform translatory or angular movements in response to axial movements of a motion transmitting spindle in a composite housing for two pairs of valves which control the flow of a hydraulic fluid to and from the prime mover. The spindle is threaded to move axially in response to rotation by an electric motor or by hand and to thereby actuate selected valves in the housing in order to regulate the flow of fluid to and from the prime mover whose output member shifts or rotates one or more driven components of a machine tool or the like. The valves which control the outflow of fluid from the prime mover receive such fluid by way of pressure regulating gauges which determine the maximum pressure at which the fluid can enter the respective valves, and the control apparatus employs safety switches which terminate or change the direction of rotation of the spindle when the output member of the prime mover encounters excessive resistance to movement.

26 Claims, 8 Drawing Figures

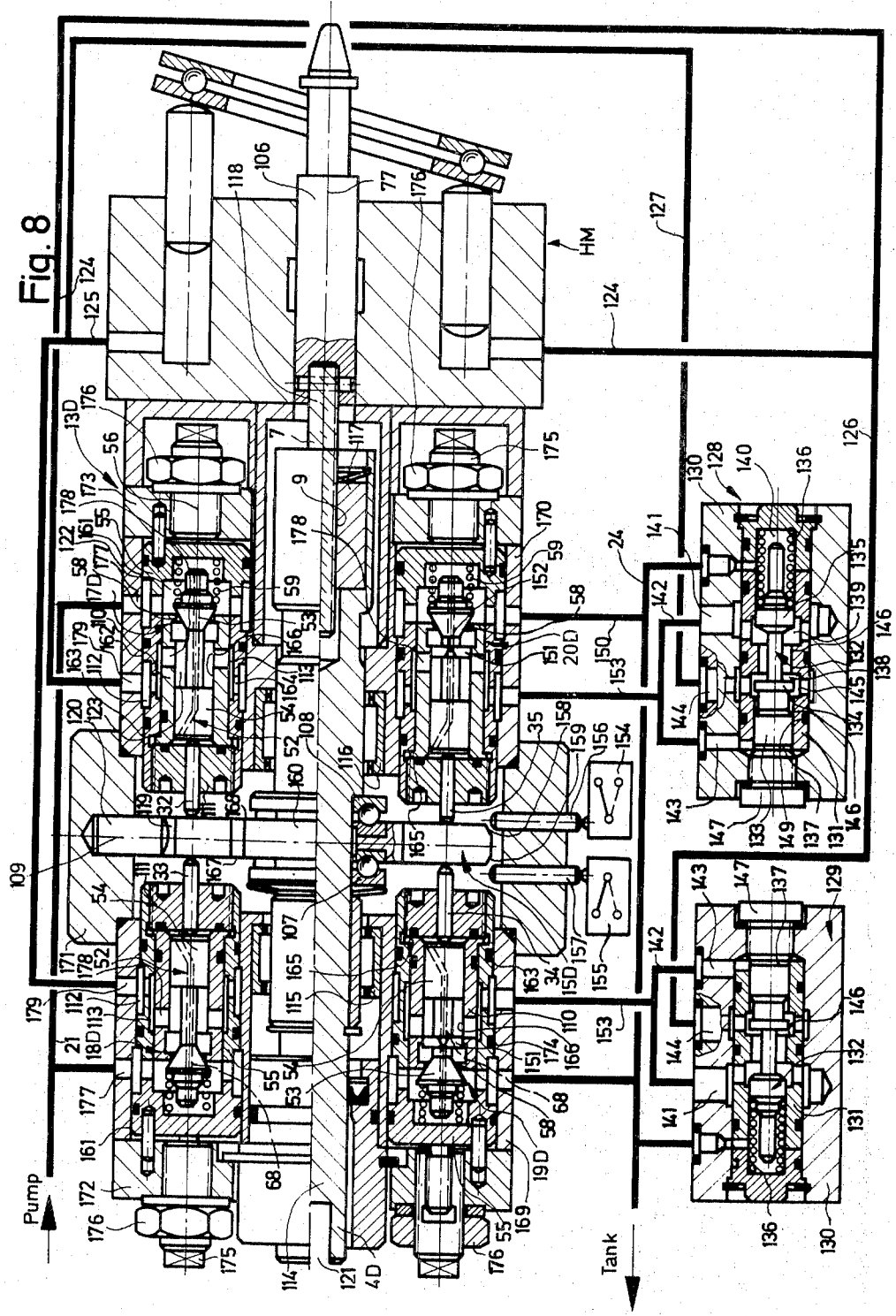

FOLLOW-UP CONTROL APPARATUS

BACKGROUND OF THE INVENTION

The present invention relates to improvements in apparatus for moving carriages or other driven parts of machine tools or the like in predetermined directions and/or through predetermined distances. More particularly, the invention relates to improvements in so-called power amplifying follow-up control apparatus which can be utilized to regulate one or more types of movements of one or more driven components in accordance with a predetermined program. For example, the follow-up control apparatus of the present invention can be utilized to initiate and control the extent of penetration of a rotary drilling or boring tool into or through a workpiece and the withdrawal of the tool from such workpiece.

A presently known follow-up control apparatus employs an impulse-responsive electric motor which actuates a single rotary directional control valve whereby the latter regulates the flow of fluid to and from a hydraulic motor which transmits motion with requisite force to one or more driven components. The electric motor receives impulses from a counter or a digital control assembly so that the extent of angular displacement of the rotor of the electric motor is directly proportional to the number of impulses and the rotational speed of the rotor is a function of the frequency of such impulses. The just described conventional follow-up control apparatus is capable of amplifying the impulses so that the angular displacement and rotational speed of the hydraulic motor which is controlled by the aforementioned rotary valve are proportional with the angular displacement and rotational speed of the electric motor. The rotary core or valve member of the valve is provided with fluid-flow controlling edges which must be machined with an extremely high degree of precision if the extent of angular movement and/or the RPM of the hydraulic motor is to accurately reflect the number and/or frequency of impulses furnished to the electric motor. However, in spite of such precision finish of the valve member, some leakage of fluid will take place in the valve body and the extent of leakage depends on such unpredictable factors as the temperature and viscosity of the fluid. Therefore, the just described followup control apparatus cannot be used under circumstances where all movements of a tool in a machine for precision treatment of workpieces must be controlled and reproduced with a very high degree of accuracy. The aforedescribed valve will especially fail to regulate the flow of fluid to and from the hydraulic motor with a sufficient degree of accuracy during travel of one or more fluid-flow regulating edges toward or from register with one or more inlets or outlets of the valve body. Moreover, such edges are not adjustable and are subject to considerable wear so that the movements of one or more driven components cannot be reproduced with the necessary degree of accuracy. Variations in load upon the shaft of the hydraulic motor bring about additional deviations from the desired extent of angular movement and/or desired rotational speed, i.e., the actual angular displacement and/or RPM of the hydraulic motor will not accurately reflect the number and/or frequency of impulses transmitted to the motor which regulates the position of the valve member. Still further, such control apparatus are not provided with any means which would arrest the electric and/or hydraulic motor in the event of an overload.

SUMMARY OF THE INVENTION

An object of the invention is to provide a novel and improved follow-up control apparatus which can transmit to one or more driven parts translatory and/or angular movements in one or more directions with a much higher degree of accuracy and reproducibility than heretofore known control apparatus.

Another object of the invention is to provide a control apparatus which automatically terminates the transmission of motion to one or more driven parts in the event of an over-load to thus reduce the likelihood of damage or complete breakdown, which is readily adjustable and whose component parts need not be machined with a very high degree of accuracy without affecting the accuracy of its motion transmitting and power-amplifying operation.

A further object of the invention is to provide the improved follow-up control apparatus with novel means for transmitting motion from an impulse-operated electric or other motor to one or more driven parts with a degree of accuracy and reproducibility which cannot be matched by presently known control apparatus.

An additional object of the invention is to provide a control apparatus which can be installed in existing machine tools or the like as a superior substitute for presently known follow-up apparatus.

Still another object of the invention is to provide novel and improved valve means for use in the improved follow-up control apparatus.

The invention resides in the provision of a follow-up control apparatus which can be utilized to transmit motion to at least one driven component (such as a reciprocable carriage) in a machine tool or the like. The apparatus comprises a housing, a motion transmitting element (such as an externally threaded spindle) which is axially movably received in the housing and can be provided with rigid or movable actuating means in the form of a disk-shaped or conical cam or the like shiftable in a compartment of the housing in response to axial movements of the motion transmitting element, a fluid-operated prime mover (such as a double-acting hydraulic cylinder) having an output member which serves to transmit motion to the driven component or components, means for moving the motion transmitting element axially with reference to the housing in accordance with a preselected program (such means may comprise a stepwise turnable motor or a direct current motor with a counter chain, and operating means for effecting movements of the output member of the prime mover in response to axial movement of the motion transmitting element with reference to the housing. Such operating means comprises a plurality of valves which are installed in the housing and are selectively actuatable by the actuating means of the motion transmitting element to thereby regulate the flow of a preferably hydraulic fluid to and from the prime mover.

The axes of the valves in the housing may be parallel with or inclined relative to the axis of the motion transmitting element; such axes may be located in a common plane and the valves may include two pairs of valves one of which is mirror symmetrical to the other pair with reference to a plane which is normal to the axis of the motion transmitting element and is preferably a symmetry plane of the actuating means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 8 is a schematic longitudinal sectional view of a fifth control apparatus which constitutes a modification of the apparatus shown in FIGS. 6 and 7.

DESCRIPTION OF THE PREFERRED EMBODIMENTS

Figure 1:
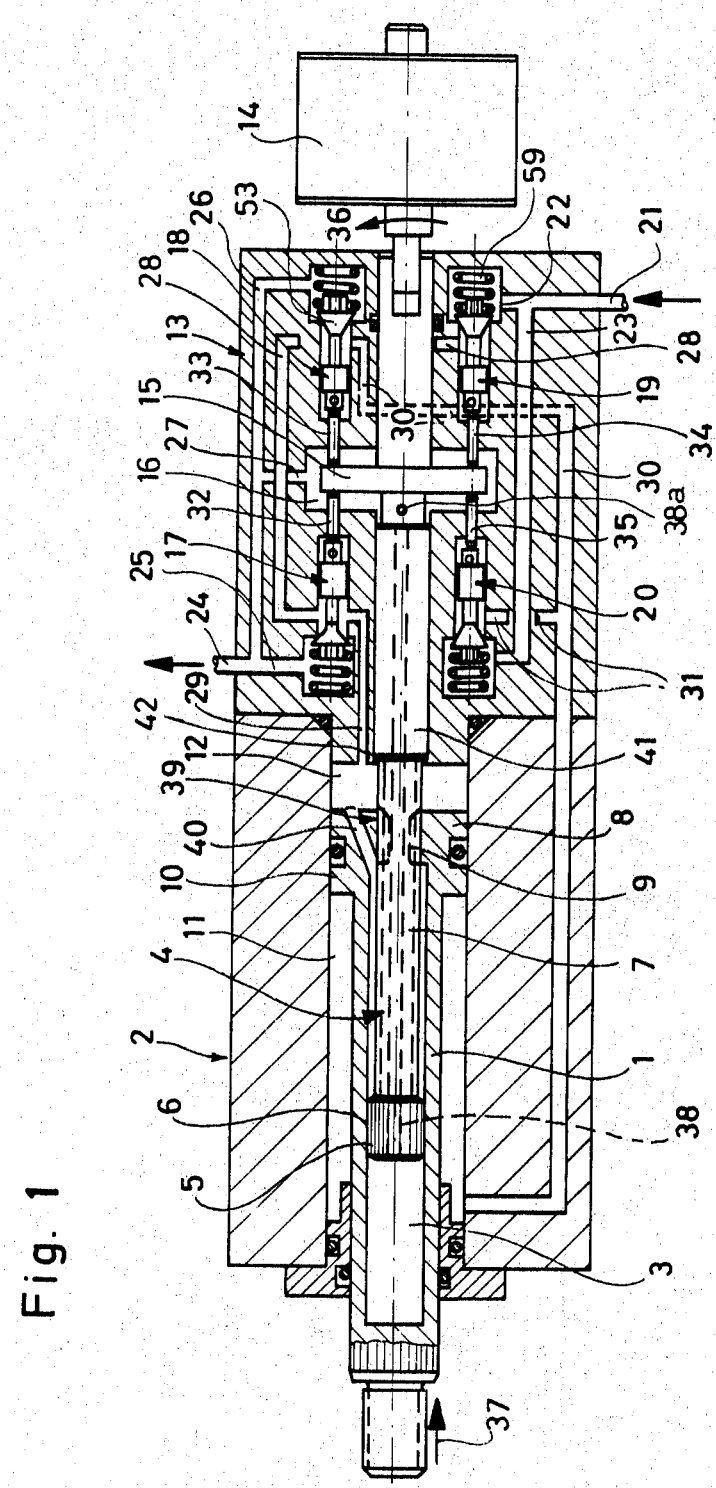
FIG. 1 is a longitudinal sectional view of a follow-up control apparatus which embodies one form of the invention.

Referring first to FIG. 1, there is shown a follow-up control apparatus which comprises a fluid-operated prime mover here shown as a double-acting working cylinder 2 having an output member including a hollow piston 10 and a hollow piston rod 1. The output member 1, 10 can transmit motion to a carriage 101 (see FIG. 5) or to another driven component in a machine tool or the like. The blind axial bore 3 of the piston rod 1 receives a portion of a motion transmitting element in the form of a spindle 4 the left-hand end portion or head 5 of which is provided with a cylindrical sealing surface 6 which is slidable along a smooth internal surface of the piston rod 1. That portion of the spindle 4 which is adjacent to the head 5 is provided with external threads 7 meshing with internal threads 9 at the right-hand end 8 of the piston rod 1, this end 8 being rigid (e.g., integral) with the piston 10. The piston 10 divides the interior of the cylinder 2 into two discrete pressure chambers 11 and 12. Suitable means (not shown) is provided to hold the piston rod 1 against rotation with reference to the cylinder 2.

The right-hand end of the cylinder 2 is connected with a housing 13 whose axis coincides with the axis of the spindle 4. The right-hand end portion of the spindle 4 is coupled with the output element of a motor 14 (e.g., a step motor or a d-c motor with a counter chain) which serves to rotate the spindle at predetermined intervals and through angles of predetermined magnitude, i.e., in accordance with a predetermined program. An intermediate portion of the spindle 4 in the housing 13 carries an actuating member in the form of a disk-shaped cam 15 which rotates with the spindle and serves to actuate selected ones of four valves 17, 18, 19 and 20 which serve to effect movements of the output member 1, 10 in response to axial movement of the spindle with reference to the housing 13. The cam 15 is rotatable and movable axially in a compartment 16 of the housing 13. The valves 17, 20 are located at one side and the valves 18, 19 are located at the other side of the cam 15. The valve members 52 (to be described in detail with reference to FIG. 2) of the valves 17-20 are reciprocable in parallelism with the axis of the spindle 4. A supply conduit 21 for pressurized fluid (e.g., oil) is conneted with an inlet of the housing 13 and communicates with channels 22, 23 which serve to supply such fluid to the valves 19 and 20. A return conduit 24 is connected with an outlet of the housing 13 and communicates with channels 25, 26 for the valves 17, 18. The channel 26 (and hence the return conduit 24) is further connected with the compartment 16 of the housing 13 by way of a port 27; this insures that any fluid which happens to leak into the compartment 16 can be evacuated by way of the conduit 24 in nonpressurized condition. The valves 19 and 17 are connected with the chamber 12 of the cylinder 2 by way of channels 28, 29, and the valves 18, 20 are connected with the chamber 11 by way of channels 30 and 31. As shown, the channel 28 communicates with the chamber 12 by way of the channel 29, and the channel 31 communicates with the chamber 11 by way of the channel 30. The valve members 52 of the valves 17 to 20 are respectively provided with pin-shaped followers 32, 33, 34, 35 which extend into the compartment 16 and track the respective end faces of the cam 15. If the cam 15 depresses the follower 32 of the valve 17, the latter connects the channel 25 with the channel 29 so that the chamber 12 communicates with and can discharge fluid into the return conduit 24. When the cam 15 depresses the follower 34 of the valve 19, the latter connects the channel 22 with the channel 28 so that the chamber 12 communicates with and can receive pressurized fluid from the supply conduit 21. The situation is analogous for the chamber 11, conduits 21, 24 and valves 18, 20. Thus, axial movements of the spindle 4 and its cam 15 can result in opening or closing of selected valves in the housing 13 to thus regulate the admission of pressurized fluid into and evacuation of fluid from the chambers 11 and 12.

If the motor 14 rotates the spindle 4 in the direction indicated by the arrow 36, the spindle threads itself into the piston rod 1 so that the cam 10 moves toward the valves 17, 20 and depresses the respective followers 32, 35. The follower 32 moves the valve member 52 of the valve 17 to its open position and the valve member allows fluid to flow from the chamber 12, through the channels 29, 25 and into the return conduit 24. At the same time, the follower 35 moves the valve member 52 of the valve 20 to its open position so that pressurized fluid can flow from the supply conduit 21, via channels 23, 31, 30 and into the chamber 11 of the cylinder 2. The fluid which flows into the chamber 11 moves the piston 10 and the piston rod 1 in a direction to the right (arrow 37) whereby the piston 10 expels fluid from the chamber 12 by way of the open valve 17. The spindle 4 shares the rightward movement of the piston rod 1 and causes its cam 15 to move toward the followers 33, 34 so that the valves 17 and 20 close. The movement of the spindle 4 in the direction indicated by the arrow 37 is terminated in a fully automatic way when the valve members 52 of the valves 17, 20 are permitted to reassume their closed positions because the chamber 11 then ceases to receive pressurized fluid from the supply conduit 21 and the return conduit 24 is sealed from the chamber 12.

If the motor 14 is caused to rotate the spindle 4 counter to the direction indicated by the arrow 36, the cam 15 leaves its neutral position and depresses the followers 33, 34 of the valve members 52 in the right-hand valves 18, 19 of FIG. 1. This is due to the fact that the spindle 4 is then caused to rotate in a direction to move its head 5 toward the piston 10 and the cam 15 moves toward the right-hand axial end of the compartment 16. The valve member 52 of the valve 19 establishes communication between the channels 22, 28, 29 so that the supply conduit 21 can deliver pressurized fluid into the chamber 12, and the valve member 52 of the valve 18 establishes communication between the channels 26 and 30 so that the return conduit 24 can receive fluid from the chamber 11. The fluid which flows into the chamber 12 causes the piston 10 to expel fluid from the chamber 11 and the piston rod 1 (together with the spindle 4 and cam 15) moves in a direction to the left, as viewed in FIG. 1. The leftward movement of the parts 1, 4 and 10 is terminated when the cam 15 returns to its neutral position in which all four valves 17–20 are closed. If the motor 14 continues to rotate the spindle 4 counter to the direction indicated by the arrow 36 when the valve members of the valves 18, 19 are open, the spindle 4 causes the piston rod 1 to move further in a direction to the left, as viewed in FIG. 1, to the extent determined by the extent of further rotary movement of the spindle.

The pressure in the blind bore 3 of the piston rod 1 at the left-hand side of the head 5 corresponds to pressure in the compartment 16 due to the provision of an axial bore 38 on the spindle 4. The left-hand end of the bore 38 is open to communicate with the left-hand end of the blind bore 3 and the right-hand end of the bore 38 communicates with the compartment 16 by way of a diametrically extending bore 38a of the spindle 4. To insure a volumetric equalization of fluid which is displaced by the mating threads 7, 9 of the spindle 4 and the piston rod 1, the internal threads 9 are bypassed by a duct 40 in the piston 10. The constant abutment of one and the same flank of threads 7 against one and the same flank of threads 9 is insured by making the cross section of the spindle portion 41 in the region (42) where the spindle enters the working cylinder 2 larger than the effective cross-sectional area of the head 5; therefore, the fluid pressure invariably tends to urge the spindle 4 in the direction indicated by the arrow 37. This can also be achieved in a number of other ways; all that counts is to insure that predetermined angular movements of the spindle 4 bring about predetermined axial movements of the piston rod 1 and/or spindle without any appreciable play between the parts 1 and 4.

Figure 2:
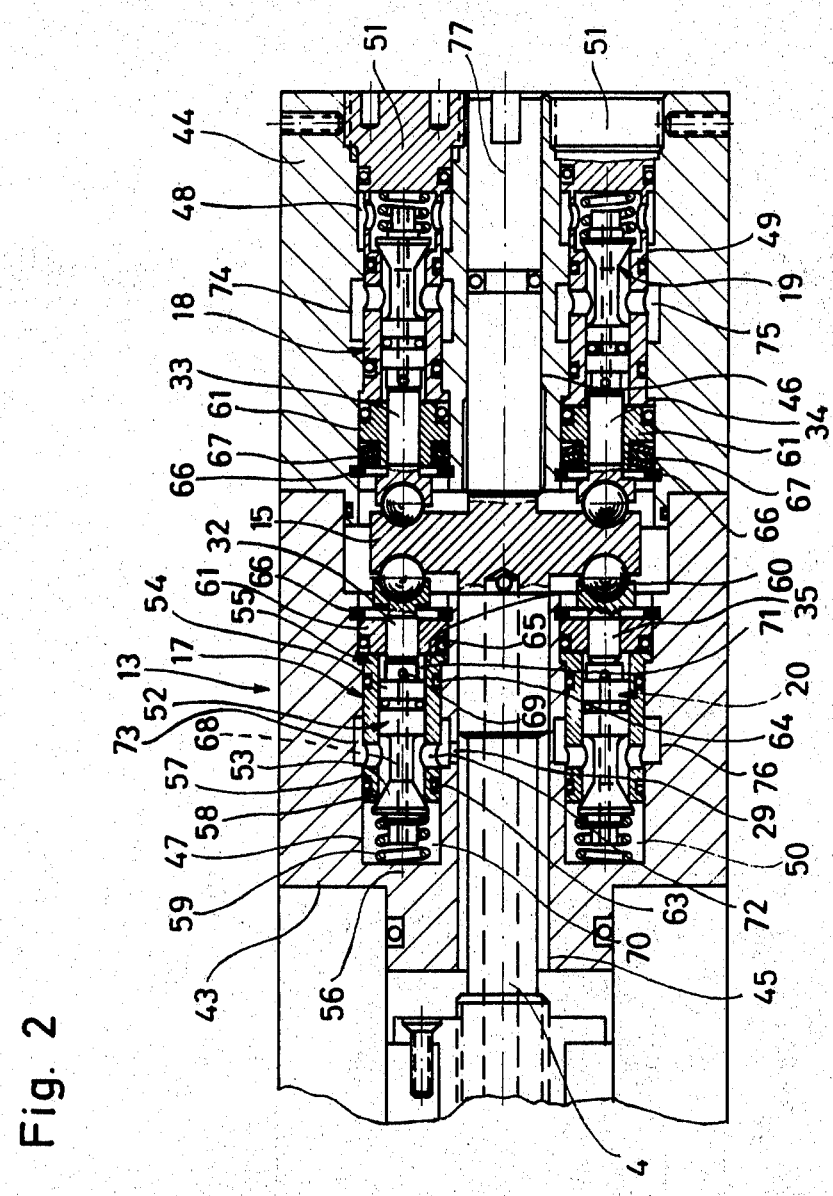
FIG. 2 is an enlarged view of a detail in the apparatus of FIG. 1.

FIG. 2 illustrates on a larger scale certain details of the spindle 4, housing 13 and valves 17 to 20. The housing 13 comprises two coaxial cylindrical portions 43, 44 which are sealingly connected to each other and are provided with registering bores 45, 46 for reception of the respective portions of the spindle 4. The valves 17, 20 and 18, 19 are accommodated in axially parallel recesses 47, 50 and 48, 49 which are respectively machined into the housing portions 43, 44. The axial positions of the two right-hand valves 18, 19 are adjustable by threaded plugs 51 which mesh with internal threads provided in the right-hand end portions of the recesses 48, 49. The axially movable valve members 52 of the valves 17-20 have cylindrical portions 54 which are reciprocable in sleeve-like valve bodies 55 whose axes are denoted at 56. Each valve body 55 has an end portion 57 which defines a conical seat 58 for the complementary sealing surface 53 of the respective valve member 52. The valve members 52 are normally biased against the end portions 57 by valve springs 59. The other end portion 61 of each valve body 55 has a bore for the respective follower 32, 33, 34 or 35 which carries a socket for a spherical rolling element 60 receivable in a ring-shaped groove at the corresponding axial end of the cam 15 in the compartment 16. When the cam 15 bears against the respective spherical element 60, the corresponding valve member 52 is depressed against the opposition of the spring 59 and its conical sealing surface 53 moves away from the seat 58 of the corresponding valve body 55. Sealing rings 63, 65 and 64 are respectively inserted into grooves provided therefor in the valve bodies 55 and valve members 52. Split rings 66 are inserted into internal grooves provided in the housing portions 43, 44 to serve as abutments for the valve bodies 55 and to oppose the bias of the respective springs 59. Packages of dished springs 67 are inserted between the split rings 66 for the valves 18, 19 and the adjacent end portions 61 of the respective valve bodies 55 to bias the valve bodies against the threaded plugs 51. By rotating a threaded plug 51, the operator can change the axial position of the respective valve body 55 and the bias of the associated springs 67. It is clear that the dished springs 67 can be replaced with other types of biasing means.

The valve members 52 of the valves 17–20 are hydraulically relieved by being provided with axial bores 68 and diametrically extending bores 69 which establish communication between the portions 70, 71 of the respective recesses 47, 48, 49, 50. The valve bodies 55 have ports 72 which communicate with annular spaces 73, 74, 75, 76 (valves 17, 18, 19, 20). The space 73 associated with the valve 17 is connected with the bore 45 of the housing portion 43 by way of the channel 29. The axis of the spindle 4 is indicated at 77.

An important advantage of valves 17 to 20 over the rotary valve of conventional follow-up control apparatus is that the surfaces 53 of the valve members 52 can cooperate with the seats 58 to hermetically seal the respective chambers 11, 12 from the conduits 21, 22 even if the valves are not machined with a high degree of precision. Moreover, the sealing action of the valves 17 to 20 is reproducible with maximum accuracy even if the movable parts of the valves undergo considerable wear. Still further, eventual leakage of hydraulic fluid into the compartment 16 or elsewhere cannot influence the accuracy with which the spindle 4 transmits motion to the followers 32–35 in order to cause the output member 1, 10 of the cylinder 2 to transmit motion to a carriage or the like, either in or counter to the direction indicated by the arrow 37.

It is further clear that all four valves in the housing 13 can be mounted in such a way that they are adjustable in the respective recesses 47–50 to thus facilitate accurate setting. Since the portions 43, 44 of the housing 13 are readily separable, the valves 17, 20 are just as easily accessible as the valves 18, 19 to facilitate convenient inspection, adjustment or replacement. It will be noted that, when the housing 13 is fully assembled, the valves 17, 20 are mirror symmetrical to the valves 18, 19 with reference to a first plane which is normal to the axis 77 of the spindle 4 and is also a symmetry plane of the cam 10. Also, the valves 17, 18 are respectively mirror symmetrical to the valves 20, 19 with reference to a second plane which is normal to the first plane and includes the axis 77 of the spindle 4. The provision of bores 68 and 69 in the valve members 52 of the valves 17–20 insures that the opening and closing of such valves is not influenced by eventual fluctuations in the pressure of fluid which is admitted by way of the supply conduit 21.

Figure 3:
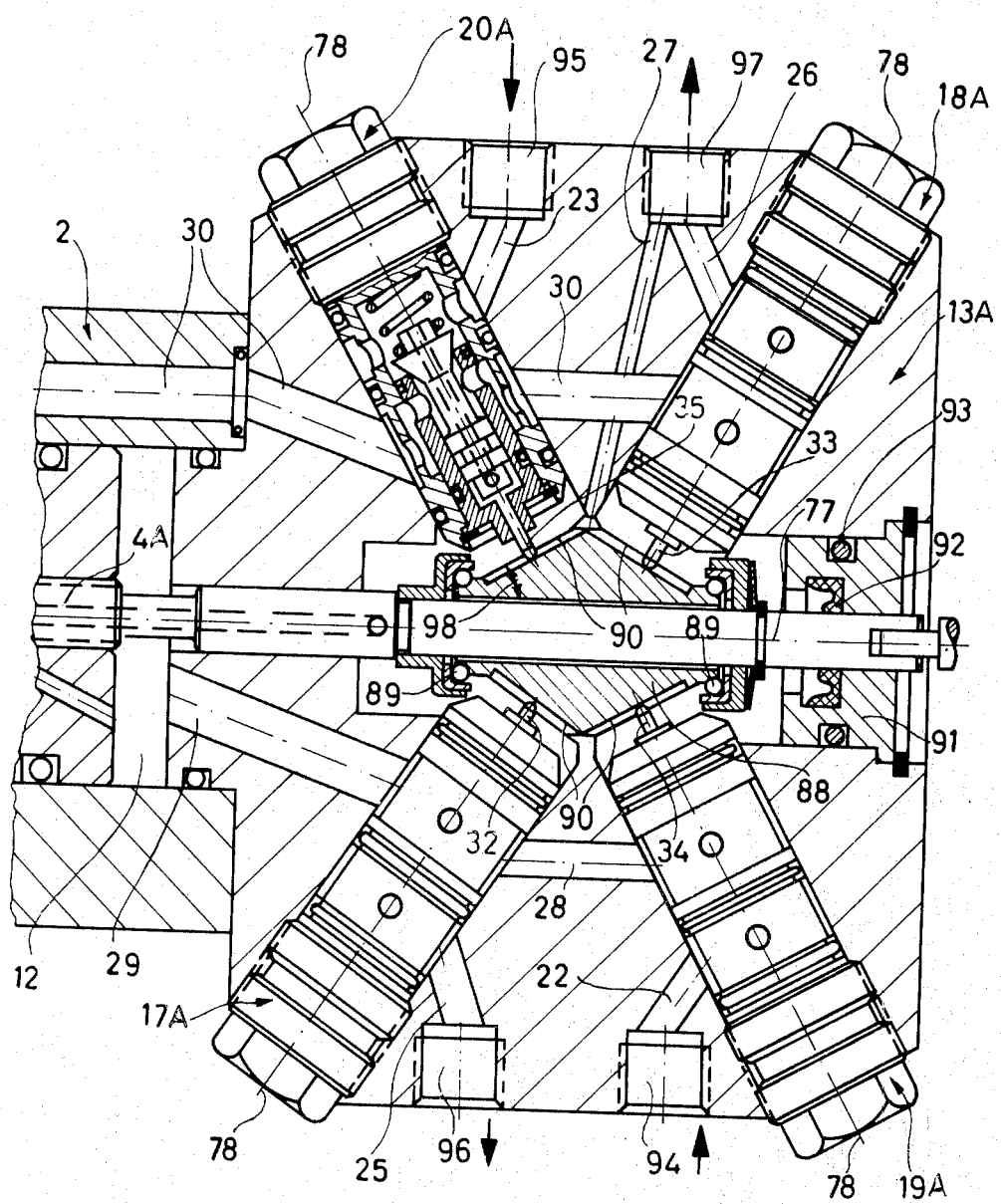
FIG. 3 is a fragmentary longitudinal sectional view of a second apparatus.
Figure 4:
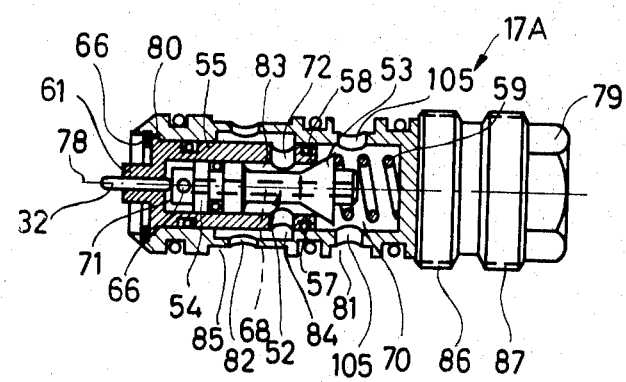
FIG. 4 is a partly elevational and partly axial sectional view of one of the four valves in the apparatus of FIG. 3.

In the apparatus of FIG. 3, the axes 78 of the valves 17A, 18A, 19A, 20A make oblique angles with the axis 77 of the spindle 4A. These valves are accommodated in recesses of a modified housing 13A. The valves 17A–20A are of identical design, and one thereof is illustrated in FIG. 4. The body 55 of the valve shown in FIG. 4 is received in an outer shell 79 which has a polygonal end portion accessible from without the housing 13A and accommodates a split ring 66 for a flange 80 of the valve body 55. Radial ports 105 connect the recess portion 70 in the shell 79 with an annular groove 81 which is machined into the external surface of the shell 79. The radial ports 72 of the valve body 55 communicate with radial ports 82 of the shell 79 by way of an annular space 84 between the members 55, 79, and the ports 82 communicate with an annular groove provided in the external surface of the shell 79. The ports 72 further communicate with an annular space 83 between the conical sealing surface 53 and the cylindrical portion 54 of the valve member 52.

The shell 79 of each of the four valves 17A–20A is adjustable in the direction of the respective axis 78. To this end, each shell 79 comprises two axially spaced portions 86, 87 provided with fine threads having identical diameters but slightly different leads. The difference in leads is about 20 percent; this insures that the shells 79 are mounted in the housing 13A without any axial play and furnishes a self-locking action.

The spindle 4A carries a modified actuating member or cam 88 having two conical surfaces whose bases are adjacent to each other. The cam 88 is mounted on the spindle 4A in two thrust bearings 89 which hold it against axial displacement with reference to the spindle. The means for preventing rotation of the cam 88 with the spindle 4A comprises elongated grooves or flutes 90 machined into the conical surfaces of the cam 88 and receiving the adjoining ends of the followers 32, 33, 34, 35. The grooves 90 are located in a plane which includes the axis 77 and the followers 32–35 so that these followers are moved axially in response to axial displacement of the spindle 4A.

The right-hand end portion of the spindle 4A is received in a bearing sleeve 91 which seals the axial bore of the housing 13A and sealingly surrounds the spindle. To this end, the sleeve 91 comprises an external groove for a sealing element 93 which engages the adjacent internal surface of the housing 13A and an internal recess for a sealing element 92 which engages the peripheral surface of the spindle 4A.

The valves 19A and 20A are connected with inlets 94, 95 for pressurized fluid by way of the channels 22 and 23. The outlets 96, 97 for fluid at atmospheric pressure are connected with the valves 17A and 18A by way of the channels 25 and 26. The magnitude of the angle 98 determines the sensitivity of the follow-up control apparatus, i.e., the apparatus is more sensitive if the angle 98 between the axis 77 and any one of the grooves 90 is increased.

All reference numerals shown in FIGS. 3–4 but not specifically mentioned denote parts which are identical with or clearly analogous to similarly referenced parts shown in FIGS. 1 and 2.

The apparatus of FIG. 3 exhibits the important advantage that all four valves 17A-20A are readily accessible without necessitating even partial dismantling of the remaining parts of the apparatus. The angles 98 between the axes 78 of the valves 17A–20A and the axis 77 of the spindle 4A may (but need not) be in the range of 45 degrees. It will be noted that the valve 17A, 20A are mirror symmetrical to the valves 19A, 18A with reference to a plane which is normal to the axis 77 and is the main symmetry plane of the conical actuating member 88.

Figure 5:
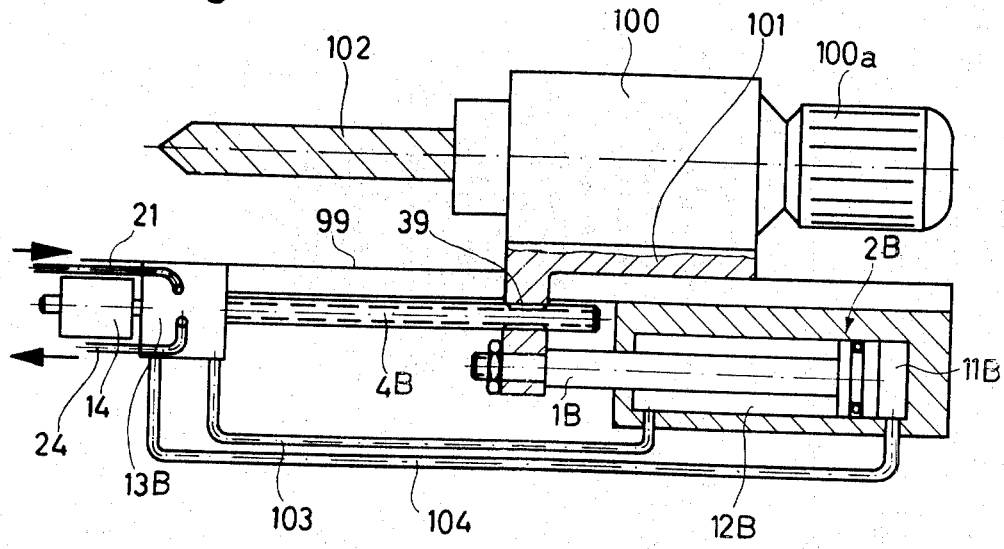
FIG. 5 is a fragmentary partly elevational and partly longitudinal sectional view of a third apparatus which controls the movements of a carriage for a drilling or boring device in a machine tool.

In the embodiment of the follow-up control apparatus shown in FIG. 5, the spindle 4B does not extend into the working cylinder 2B. The latter is mounted on a base or other portion 99 of a machine frame which supports a drilling or boring device 100 having a motor 100a which can drive a drilling or boring tool 102. The cylinder 2B is connected with and serves to displace a carriage 101 for the drilling device 100; to this end, a downwardly extending bracket 39 of the carriage 101 comprises a bore for one end portion of and is secured to the piston rod 1B of the cylinder 2B. The spindle 4B is provided with threads meshing with internal threads of the bracket 39. This bracket is preferably located close to the tool 102 of the drilling device 100 to reduce the likelihood of inaccuracies in transmission of motion to the carriage 101 and tool 102 by reducing the likelihood of deformation. The housing 13B of the apparatus shown in FIG. 5 is connected with a pump (not shown) by means of the supply conduit 21 and with a tank (not shown) by the return conduit 24. The conduits 103, 104 connect the chambers 11B, 12B of the cylinder 2B with the valves (not shown) in the housing 13B. The spindle 4B can be rotated by the motor 14. The bracket 39 is also shown in FIG. 1.

Figure 6:
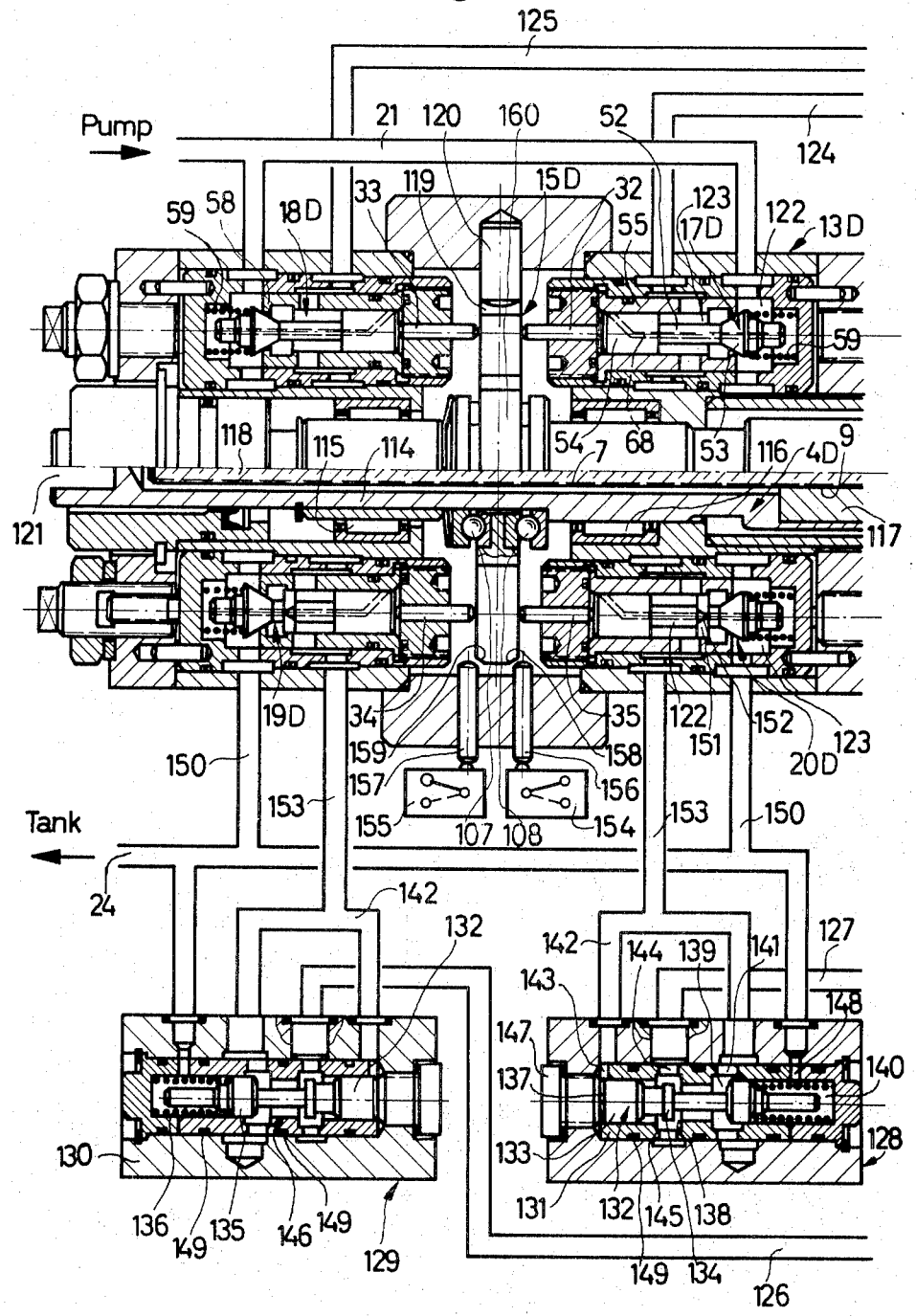
FIG. 6 is a schematic partly elevational and partly longitudinal sectional view of the left-hand portion of a fourth control apparatus.
Figure 7:
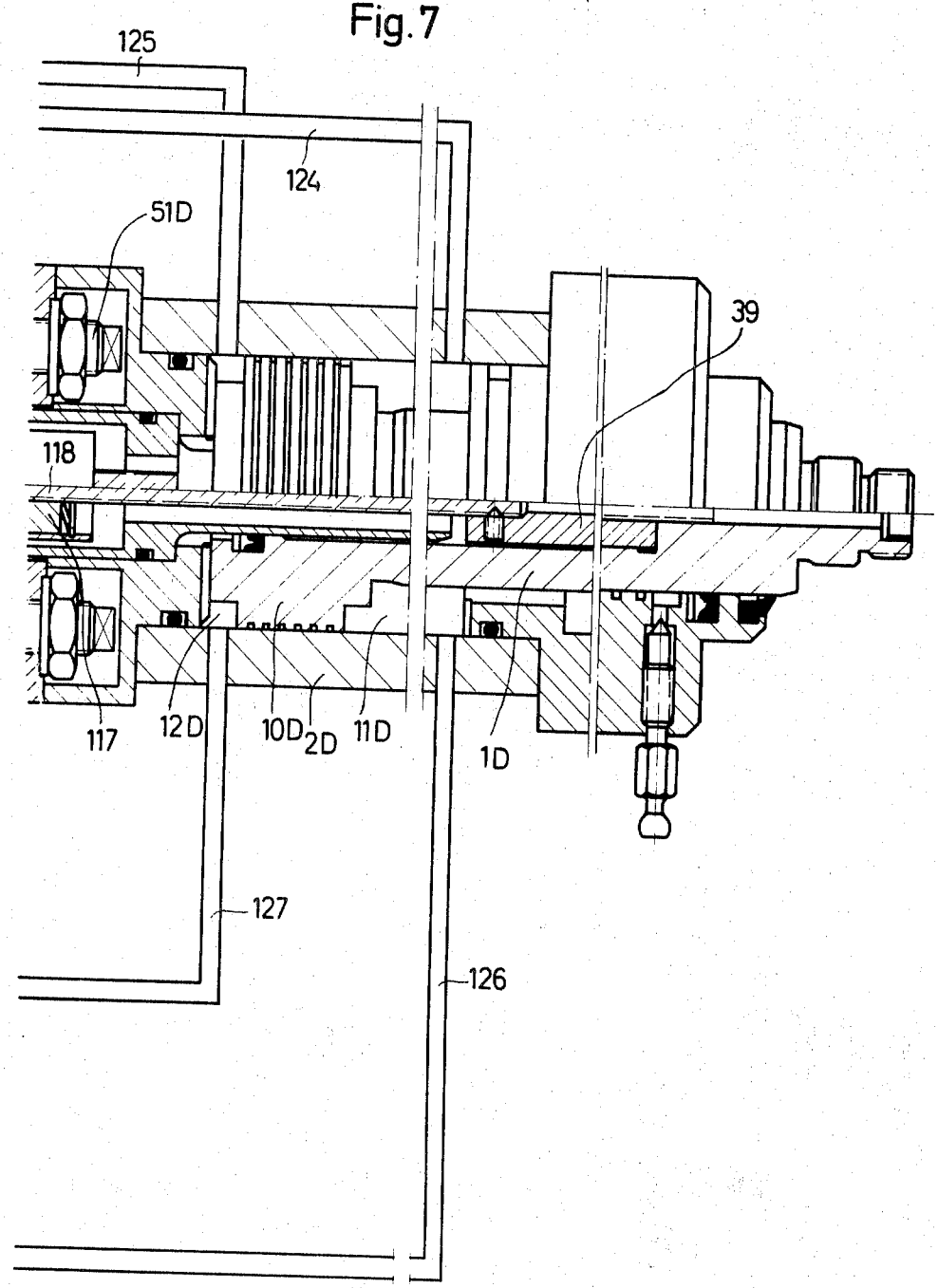
FIG. 7 is a schematic partly elevational and partly longitudinal sectional view of the right-hand portion of the control apparatus of FIG. 6.

Referring to FIGS. 6 and 7, there is shown a fourth follow-up control apparatus wherein the spindle 4D comprises an elongated sleeve 114 which is rotatable in needle bearings 115, 116, a nut 117 which is secured to the sleeve 114 and is provided with external threads 9, and a screw 118 whose threads 7 mesh with the threads 9 of the nut 117. The screw 118 is coupled to the piston rod 1D of the piston 10D in the working cylinder 2D by means of the bracket 39. The actuating means 15D comprises a disk-shaped cam 160 which is mounted on the sleeve 114 by means of thrust bearings 107, 108 so that the sleeve 114 can rotate relative to the cam 160 but the latter is compelled to share all axial movements of the sleeve. The periphery of the cam 160 is provided with an axially parallel slot 119 for the inner end of a pin 120 which is mounted in the housing 13D and serves to prevent rotation of the actuating means 15D. The left-hand end of the sleeve 114 is provided with an axially parallel slot 121 for reception of the output element of a numerically controlled step motor, a handwheel or any other device which serves to rotate the sleeve 114 through angles of predetermined magnitude.

The housing 13D accommodates four valves 17D, 18D, 19D, 20D each of which comprises an axially movable valve member 52 having a conical sealing surface 53 which is disposed between a pressure space 122 and a relieved space 123 in the respective valve body 55. The axes of the valves 17D–20D are parallel to the axis of the spindle 4D, the same as in FIG. 1. Threaded adjusting members 51D serve to facilitate accurate adjustments of the valves 17D–20D with reference to the housing 13D; such adjustments are desirable in order to insure that the clearance between the followers 32–35 of the valves 17D–20D and the cam 160 is minimal in the neutral or central position of the actuating means 15D. Moreover, the adjusting members 51D allow for individual adjustment of each follower relative to the cam 160.

The pressure spaces 122 in the valve bodies 55 of the valves 17D, 18D are connected with the supply conduit 21 which receives pressurized hydraulic fluid from a pump or the like. The relieved spaces 123 in the valves 17D, 18D are connected with chambers 11D, 12D of the working cylinder 2D by way of conduits 124, 125.

In accordance with a feature of the embodiments which is shown in FIGS. 6 and 7, the connections between the valves 19D, 20D and the working cylinder 2D comprise two identically constructed adjustable pressure regulators or gauges 128, 129 shown in the lower part of FIG. 6. These gauges are respectively installed in conduits 126, 127 which respectively communicate with the chambers 11D, 12D of the cylinder 2D. Each of the two gauges 128, 129 comprises a casing 130 for a cylinder 131 which accommodates a reciprocable valve member or spool 132 with three axially spaced pistons or lands 133, 134, 135. A helical spring 136 engages the adjacent end face of the land 135 and urges the spool 132 axially toward a threaded sealing plug or abutment 147. The lands 133–135 subdivide the interior of the cylinder 131 into a pressure space 137, a supply space 138, a return space 139 and a spring compartment 140. Ports 141 in the cylinder 131 connect the space 139 with a conduit 142 which can communicate with the space 137 by way of a port 143 in the cylinder 131. The conduit 127 is connected with the supply space 138 of the gauge 128 by way of ports 144 in the respective cylinder 131. The conduit 126 is similarly connected with the space 138 in the cylinder 131 of the gauge 129. The valve compartments 140 of both cylinders 131 are connected with the return conduit 24 by way of ports 148. The cylinders 131 are further provided with internal annular grooves 145 whose axial lengths and diameters exceed the axial lengths and diameters of the respective lands 134. Thus, the spaces 138, 139 in the cylinders 131 can communicate with each other (in certain axial positions of the respective spools 132) by way of annular passages 146 surrounding the shanks of the valve members 132 between the respective lands 134, 135 and dimensioned to sealingly receive the respective lands 134. One axial end of each cylinder 131 is open so that the land 133 of the respective spool 132 can bear against the adjacent threaded plug or abutment 147 under the action of the corresponding spring 136. The plugs 147 are rotatable in the respective casings 130 to allow for adjustment of the initial stressing of springs 136. Sealing rings 149 are received in peripheral grooves of the cylinders 131 and sealingly engage the internal surfaces of the respective casings 130.

The relieved spaces 123 of the valves 19D, 20D are connected with the return conduit 24 by way of conduits 150. The valve members 52 of the valves 19D, 20D comprise pistons or lands 151 having peripheral surfaces provided with tapering flow restricting notches 152. The cross-sectional areas of the notches 152 decrease gradually in directions toward the respective relieved spaces 123. The pressure spaces 122 of the valves 19D, 20D are connected with the conduits 142 of the gauges 129, 128 by means of conduits 153.

The operation of the control apparatus shown in FIGS. 6 and 7 is basically similar to that of the apparatus shown in FIGS. 1–2 or 3–4. It is assumed that the output element of a step motor (such as the motor 14 of FIG. 1) drives the sleeve 114 of the spindle 4D whereby the sleeve 114 rotates the nut 117. Since the screw 118 is temporarily at a standstill because it is connected with the piston rod 1D whose piston 10D cannot move in the cylinder 2D, rotation of the sleeve 114 results in an axial movement of this sleeve, for example, in the direction toward the piston 10D of the cylinder 2D. The sleeve 114 entrains the actuating means 15D in the same direction (by way of the thrust bearing 107) whereby the cam 160 of the actuating means displaces the followers 32, 35 of the valves 17D, 20D in the housing 13D. Thus, the conical surfaces 53 of the respective valve members 52 are moved away from the adjacent seats 58 of the valve bodies 55. Consequently, pressurized fluid can flow from the pump, by way of the supply conduit 21, pressure space 122 of the valve 17D, space 123 of the valve 17D, conduit 124, and into the chamber 11D of the working cylinder 2D, i.e., the piston 10D is moved in a direction to the left, as viewed in FIG. 7. The piston 10D expels fluid from the chamber 12D whereby such fluid flows by way of the conduit 127 and into the gauge 128. Such fluid passes through the ports 144, supply space 138, passage 146, ports 141, conduit 142, port 143, and enters the pressure space 137. The fluid acts against the left-hand end face of the land 133 and shifts the spool 132 of the gauge 128 against the opposition of the respective spring 136 so that the land 134 approaches the passage 146 in the cylinder 131 of the gauge 128. The fluid which is expelled from the chamber 12D also flows from the conduit 142 into the conduit 153 to enter the pressure space 122 of the valve 20D and to flow through the flow restricting notch 152 of the land 151 on the valve member 52 of the valve 20D on its way into the relieved space 123 because the conical surface 53 of the valve member 52 is moved away from its seat by the follower 35. The fluid which has passed through the notch 152 flows into the conduit 150 and thence into the return conduit 24 for entry into the tank. The flow restricting notch 152 of the land 151 in the valve 20D causes a rise of fluid pressure in the pressure space 137 of the gauge 128 so that the spool 132 is shifted against the opposition of the respective spring 136. Consequently, the cross-sectional area of the throttling gap between the land 134 and the adjacent end of the passage 146 in the cylinder 131 of the gauge 128 is proportional to the fluid pressure in the conduit 127 which receives fluid from the chamber 12D of the working cylinder 2D. In other words, the pressure of fluid in the conduit 142 of the gauge 128 and in the conduit 153 of the valve 20D depends on the stressing of spring 136 in the gauge 128. The fluid continues to flow from the conduit 142 of the gauge 128, through the conduit 153 of the valve 20D and through the notch 152 of the land 151 on the valve member 52 of the valve 20D to enter the conduits 150 and 24. The differential between the fluid pressures in the conduits 153, 150 (i.e., upstream and downstream of the notch 152 of the land 151 in the valve 20D) cannot exceed a preselected value which is determined by the setting of the gauge 128, e.g., three atmospheres absolute pressure. Such pressure differential is totally independent of the pressure in the conduit 127 which latter pressure varies in dependency on the load upon the piston 10D of the working cylinder 2D.

The situation is analogous when the aforementioned motor rotates the sleeve 114 of the spindle 4D in a direction to move away from the cylinder 2D. The piston 10D is then caused to move in a direction to the right, as viewed in FIG. 7, and the fluid which is expelled from the chamber 11D (while the chamber 12D receives pressurized fluid by way of the valve 18D) is caused to flow through the gauge 129 and valve 19D on its way into the return conduit 24.

If the piston rod 1D of the working cylinder 2D encounters an excessive resistance to axial movement, the parts of the apparatus might be subjected to such unwarranted stresses which are likely to result in damage to or complete breakdown of the control apparatus. In such instances, the axial displacement of the piston 10D is not proportional to the axial displacement of the cam 160 of the actuating means 15D on the sleeve 114. Thus, if the piston 10D cannot move axially but the sleeve 114 rotates under the action of the motor whose output element extends into the slot 121 of the sleeve 114, such rotation might cause damage to the control apparatus, to the workpiece which is being treated by a tool receiving motion from the coupling bracket 39, and/or to such tool. Therefore, the apparatus comprises a safety device including two limit switches 154, 155 which can be actuated by axially movable pin-shaped trips 156, 157 mounted in the housing 13D for movement radially of the spindle 4D and extending into the path of suitably inclined cam faces 158, 159 on the adjacent portion of the cam 160. The limit switches 154, 155 are shown as being outwardly adjacent to the housing 13D. Each of the limit switches 154, 155 can arrest the motor which rotates the sleeve 114 or it causes such motor to reverse the direction of its rotation and to thus reduce the likelihood of damage to the control apparatus, to the tool or tools and/or to the workpiece or workpieces. The exact timing of actuation of the limit switches 154, 155 can be readily selected by appropriate mounting of these switches with reference to the housing 13D as well as by appropriate mounting and dimensioning of the trips 156, 157. Also, such timing can be determined by appropriate configuration of cam faces 158, 159 on the cam 160 of the actuating means 15D. It is further clear that the mechanically operated safety switches 154, 155 can be replaced by inductively operated switches and/or other safety devices which can automatically terminate the rotation of spindle 4D or reverse the direction of rotation of such spindle when the output member 1D, 10D of the working cylinder 2D offers excessive resistance to axial movement.

In the heretofore described embodiments of the invention, the output member of the prime mover (such as the parts 1D, 10D of the working cylinder 2D shown in FIGS. 6 and 7) is caused to move axially in response to axial movement of the spindle (e.g., in response to axial movement of the sleeve 114). The apparatus of FIG. 8 employs a rotary output member 106 which constitutes a shaft and forms part of a prime mover in the form of rotary hydraulic motor HM the exact details of which (save for the fact that it is controlled by the apparatus shown in the left-hand part of FIG. 8) form no part of the present invention. The construction of the control apparatus is very similar to that of the apparatus shown in FIGS. 6 and 7; therefore, all such parts of the control apparatus of FIG. 8 which are identical with or clearly analogous to the corresponding parts of the apparatus of FIGS. 6 and 7 are denoted by similar reference characters.

The slot 121 of the sleeve 114 which forms part of the spindle 4D is again connectable with the output element of a servo motor, a d-c motor with an impulse counter, an electrical impulse motor, step motor or a manually operable device for rotating the sleeve 114 through predetermined angles and at desired (preferably predetermined) intervals. The disk-shaped cam 160 of the actuating means 15D is compelled to share all axial movements of the sleeve 114 due to the provision of thrust bearing 107, 108 but the pin 120 holds the cam 160 against rotation with the sleeve 114. The valves 17D, 18D are connected with the supply conduit 21 for pressurized fluid; these valves are mirror symmetrical to each other with reference to the central symmetry plane 109 of the cam 160. The axes 56 of the valves 17D, 18D are parallel to the axis 77 of the spindle 4D. The same holds true for the valves 19D, 20D which are connected with the return conduit 24.

Each of the valves 17D–20D comprises a hollow valve body 55, a cylindrical insert 110 in the respective body 55, a threaded plug 111, a valve member 52, and a valve spring 59. The valve body 55 comprises three cylindrical portions 161, 162, 163 of different outer diameters and is provided with an external groove 112, an internal groove 113, and ports 164 which connect the groove 112 with the groove 113. The insert 110 has a shoulder 165 which abuts against the adjacent end face of the respective plug 111 so that it is held in a predetermined axial position with reference to the valve body 55. A bore 166 of the insert 110 slidably receives the cylindrical portion 54 of the respective valve member 52. The cylindrical portion 54 is spaced from the respective conical sealing surface 53 which cooperates with the respective annular seat 58, such seat being provided on the corresponding insert 110. The spring 59 normally maintains the conical surface 53 in sealing engagement with the respective seat 58. The threaded plugs 111 serve to guide the respective followers 32, 33, 34, 35 which are shown as being discrete pins abutting against the cylindrical portions 54 of the respective valve members 52. The exposed ends of the pin-shaped followers 32, 33, 34, 35 abut against the respective end faces 167, 168 of the disk-shaped cam 160 which forms part of the actuating means 15D of the spindle 4D.

Each of the valves 17D-20D is readily insertable into or removable from and adjustable relative to the housing 13D. To this end, the housing 13D comprises two cylindrical portions or sections 169, 170 which are connected to each other by a ring-shaped coupling portion 171. The outer ends of the housing portions 169, 170 are respectively provided with removable covers or caps 172, 173. By removing the covers 172, 173, the person in charge can gain access to the open-ended recesses 174 which are provided in the housing portions 169, 170 to accommodate the respective valves 17D–20D. The recesses 174 sealingly receive the cylindrical portions 161–163 of the respective valve bodies 55. Thus, the valves 17D–20D can be inserted or removed from without, i.e., without necessitating a detachment of the housing portions 169, 170 from each other. The covers 172, 173 are traversed by threaded bolts 175 which serve as adjusting means for selecting the axial positions of respective valves and carry lock nuts 176 which prevent uncontrolled axial shifting of valves. The valve bodies 55 are insertable into the respective recesses 174 in directions toward the actuating means 15D.

The control valves 19D, 20D which are connected with the return conduit 24 differ from the valves 17D, 18D in that their valve members 52 comprise the aforementioned pistons or lands 151 having tapering flow restricting notches 152, the same as described in connection with the control apparatus of FIGS. 6 and 7. The lands 151 are reciprocable in bores 166 and the cross-sectional areas of the notches 152 decrease in directions from the respective pressure spaces 122 toward the corresponding relieved spaces 123.

When the spindle 4D dwells in its neutral position, the actuating means 15D does not bear against any of the followers 32–35 so that the valves 17D–20D are closed. The output shaft 106 does not rotate. If the aforementioned motor or a manually operated device rotates the spindle 4D from without the housing 13D, the sleeve 114 moves axially, for example, in a direction to the right, as viewed in FIG. 8, due to the provision of threads 7 and 9. The cam 160 depresses the followers 32, 35 of the valves 17D and 20D to lift the sealing surfaces 53 of the corresponding valve members 52 off the respective seats 58. The pressurized fluid which is admitted by way of the supply conduit 21 can flow through the inlet 177 of the housing 13D to enter the valve 17D and to flow through the seat 58 and ports 178, 179 into the conduit 124 and to the pressure side of the motor HM. The conduit 124 is further connected with the gauge 129 by way of conduit 126. The output shaft 106 begins to rotate and rotates the screw 118 to compensate for axial displacement of the spindle 4D by way of the threads 7 and 9. The spindle 4D rotates in exact synchronism with the output shaft 106; however, the shaft 106 can transmit a torque which is a multiple of the torque transmittable by the spindle 4D. The pressurized fluid which flows by way of the conduit 124 and enters the gauge 129 does not influence the operation of the apparatus because the valve 19D is closed. That portion of the conduit 125 which is connected with the valve 18D is also ineffective because the valve 18D is closed. The other portion of the conduit 125 is connected with the ports 144 (see the conduit 127) in the gauge 128. Thus, the fluid which leaves the hydraulic motor HM flows from the ports 144 to the ports 141 and into the conduit 142 of the gauge 128 to enter the conduit 153 of the valve 20D and also into the pressure space 137 of the gauge 128 by way of the port 143. The fluid in the space 137 acts upon the adjacent land 133 of the spool 132 and shifts the latter axially against the opposition of the spring 136 so that the land 134 either enters or closely approaches the passage 146 in order to terminate or throttle the flow of fluid into the conduit 142 of the gauge 128. Thus, the pressure which builds up in the conduits 142, 153 and in the pressure space 122 of the valve 20D is determined by the force of the spring 136 in the gauge 128 to thus insure that the pressure differential between the conduits 150 and 153 of the valve 20D remains constant. Since the cross-sectional area of the notch 152 in the land 151 of the valve member 52 in the valve 20D does not change, and assuming that the spindle 4D rotates at a constant speed, any changes in load upon the output shaft 106 of the hydraulic motor HM do not necessitate any adjustments when the torque which is being transmitted by the shaft 106 changes. This is due to the provision of the gauge 128 which compensates for eventual changes in fluid pressure. The situation is analogous when the spindle 4D causes the cam 160 to open the valve 18D and 19D.

The limit switches 154, 155 perform the same function as described in connection with the control apparatus of FIGS. 6 and 7.

The flow restricting notches 152 in the lands 151 of valve members 52 in the valves 19D and 20D reduce the likelihood of abrupt stressing of movable parts of these valves when the fluid flows from the chamber 11D or 12D, by way of the respective gauge 129, 128 and on to the return conduit 24. It will be noted that the lands 151 are provided between the conical sealing surfaces 53 and cylindrical portions 54 of valve members 52 in the valves 19D, 20D.

The gauges 128, 129 serve the important purpose of preventing the spindle 4D from being influenced by differences in resistance which the output member 1D, 10D or 106 encounters when the control apparatus of FIGS. 6–7 or 8 is in use. For example, if the output member 1D, 10D of FIGS. 6–7 transmits motion to the carriage of a rotary drilling or boring tool which is to penetrate into and through a metallic or other workpiece, the resistance which the rotating tool encounters rises rapidly when the tip of the tool contacts the workpiece and such resistance drops abruptly when the tool penetrates through the workpiece. The gauges 128, 129 prevent such changes in resistance which is encountered by the output member of the prime mover from effecting the adjusting action of the spindle 4D, i.e., the extent of movement which the spindle 4D causes the output member to perform is not changed due to abrupt or gradual changes in resistance to translatory or angular movements of the output member of the prime mover (such as the prime mover 2D or HM). The gauges 128, 129 insure that the pressure differential between the conduits 150, 153 of the valves 19D, 20D remains unchanged irrespective of the load upon the output member so that, ultimately, the changing resistance does not influence the extent of movement of such output member.

As mentioned before, and as shown in FIG. 5, the spindle need not be directly connected with the output member, i.e., it can be coupled thereto by a coupling device in the form of a bracket (see also the bracket 39 of FIG. 7) or the like.

Certain important advantages of the improved control apparatus can be summarized as follows: The component parts of the apparatus, especially the valves in the housing 13, 13A, 13B or 13D, need not be machined with a high degree of precision without adversely affecting the accuracy of adjustments. This contributes to a considerable reduction in the initial and maintenance costs. The spindle can regulate the operation of the output member of the fluid-operated prime mover 2, 2A, 2B, 2D or HM with a very high degree of accuracy and reproducibility, and such regulation is not affected by changes in temperature and/or viscosity of the fluid medium or by changes in the load upon the output member of the fluid-operated prime mover. The parts of the control apparatus can be readily assembeled, taken apart and reached for inspection, repair, replacement or other purposes, and all parts which necessitate periodic or initial adjustments can be adjusted in a simple and time-saving manner. The adjustments can eliminate all undesirable play. The gauges 128, 129 can be mounted externally of the housing to afford convenient access and to permit convenient and rapid adjustments of spring bias. The control apparatus is protected from overloads and can transmit motion to a reciprocable or rotary output member of the prime mover for use in a machine tool or in any other machine wherein the movements of the output member must be regulated with a high degree of accuracy and the output member is called upon to transmit substantial forces, i.e., forces whose magnitude may greatly exceed the magnitude of forces which can be transmitted by the spindle 4, 4A, 4B or 4D.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a follow-up apparatus for transmitting motion to at least one driven component of a machine tool or the like, a combination comprising a housing; a motion transmitting element axially movably received in said housing; a fluid-operated prime mover having an output member arranged to transmit motion to said driven component; means for moving said element axially with reference to said housing in accordance with a predetermined program; and operating means for effecting movements of said output member in response to axial movements of said element with reference to said housing, including a plurality of valves mounted in said housing and being selectively actuatable by said element to thereby regulate the flow of a fluid to and from said prime mover, each of said valves comprising an externally threaded portion meshing with an internally threaded portion of said housing and a valve member reciprocably received in said externally threaded portion and movable therein in response to axial displacement of said motion transmitting element.

2. In a follow-up apparatus for transmitting motion to at least one driven component of a machine tool or the like, a combination comprising a housing; a motion transmitting element axially movably received in said housing; a fluid-operated prime mover having an output member arranged to transmit motion to said driven component; means for moving said element axially with reference to said housing in accordance with a predetermined program; and operating means for effecting movements of said output member in response to axial movements of said element with reference to said housing, including a plurality of valves mounted in said housing and being selectively actuatable by said element to thereby regulate the flow of a fluid to and from said prime mover, each of said valves comprising a valve body received in a recess of said housing and a valve member reciprocably received in said valve body, and further comprising resilient means abutting against one end of at least one of said bodies and threaded adjustment means meshing with said housing and abutting against the other end of said one body so that the axial position of said one body can be changed in response to rotation of said adjusting means.

3. In a follow-up apparatus for transmitting motion to at least one driven component of a machine tool or the like, a combination comprising a housing; a motion transmitting element axially movably received in said housing; a fluid-operated prime mover having an output member arranged to transmit motion to said driven component; means for moving said element axially with reference to said housing in accordance with a predetermined program; and operating means for effecting movements of said output member in response to axial movements of said element with reference to said housing, including a plurality of valves mounted in said housing and being selectively actuatable by said element to thereby regulate the flow of a fluid to and from said prime mover, each of said valves comprising a hollow valve body, a cylindrical insert received in said valve body, a threaded member for fixing the axial position of said insert in said body, an annular feed provided in said insert, a valve member reciprocably received in said valve body, spring means for biasing said valve member against said seat, and follower means displaceable by said element to thereby move said valve member away from said seat, said follower means being reciprocably guided by said threaded member.

4. In a follow-up apparatus for transmitting motion to at least one driven component of a machine tool or the like, a combination comprising a housing; a motion transmitting element axially movably received in said housing; a fluid-operated prime mover having an output member arranged to transmit motion to said driven component; means for moving said element axially with reference to said housing in accordance with a predetermined program; and operating means for effecting movements of said output member in response to axial movements of said element with reference to said housing, including a plurality of valves mounted in said housing and being selectively actuatable by said element to thereby regulate the flow of a fluid to and from said prime mover, said housing being provided with open ended recesses for said valves, and each of said valves comprising a hollow valve body having portions of different external diameters, each of said valve bodies being sealing received in the respective recess of said housing and said element comprising actuating means for said valves, at least one of said valves being disposed at each side of said actuating means and said valve bodies being insertable into the respective recesses in directions toward said actuating means.

5. In a follow-up apparatus for transmitting motion to at least one driven component of a machine tool or the like, a combination comprising a housing; a motion transmitting element axially movably received in said housing; a fluid-operated prime mover having an output member arranged to transmit motion to said driven component; means for moving said element axially with reference to said housing in accordance with a predetermined program; operating means for effecting movements of said output member in response to axial movements of said element with reference to said housing, including a plurality of valves mounted in said housing and being selectively actuatable by said element to thereby regulate the flow of a fluid to and from said prime mover, said housing being provided with open ended recesses for said valves and with removable cover means for the open ends of said recesses; and threaded adjusting members meshing with said cover means and being rotatable to thereby change the position of said valves in the respective recesses.

6. In a follow-up apparatus for transmitting motion to at least one driven component of a machine tool or the like, a combination comprising a housing a motion transmitting element axially movably received in said housing; a fluid-operated prime mover having an output member arranged to transmit motion to said driven component; means for moving said element axially with reference to said housing in accordance with a predetermined program; and operating means for effecting movements of said output member in response to axial movements of said element with reference to said housing, including a plurality of valves mounted in said housing and being selectively actuatable by said element to thereby regulate the flow of fluid to and from said prime mover, each of said valves comprising a tubular valve body, a valve member reciprocably received in said valve body and having a conical sealing surface at one end and a cylindrical portion on the other end thereof, a hollow cylindrical insert in said valve body, and an annular seat provided in said insert, said sealing surface normally engaging said seat, said valve member being movable in said body to move said surface away from said seat in response to axial movement of said element in a predetermined direction, and said insert being arranged to reciprocably guide said cylindrical portion of said valve member.

7. In a follow-up apparatus for transmitting motion to at least one driven component of a machine tool or the like, a combination comprising a housing; a motion transmitting element axially movably received in said housing and comprising substantially disc-shaped actuating means located in said housing and axially movable with said element, an axially movable portion which is rotatable with reference to said actuating means, and thrust bearing means interposed between said portion and said actuating means so that said portion is free to rotate relative to said actuating means but the latter is compelled to share all axial movements of said portion; means for holding said actuating means against rotation with said axially movable portion of said element; a fluid-operated prime mover having an output member arranged to transmit motion to said driven component; means for moving said element axially with reference to said housing in accordance with a predetermined program; and operating means for effecting movements of said output member in response to axial movements of said element with reference to said housing, including a plurality of valves mounted in said housing and being selectively actuatable by said element to thereby regulate the flow of a fluid to and from said prime mover.

8. A combination as defined in claim 7, wherein said holding means comprises a pin mounted in said housing and extending into an axially parallel peripheral slot of said actuating means.

9. In a follow-up apparatus for transmitting motion to at least one driven component of a machine tool or the like, a combination comprising a housing comprising a plurality of separable portions and coupling means separably connecting said portions to each other, each of said housing portions being provided with at least one recess; a motion transmitting element axially movably received in said housing and comprising actuating means located within said coupling means and an axially movable portion which is rotatable relative to said actuating means; means forming part of said coupling means for holding said actuating means against rotation with said axially movable portion; a fluid operated prime mover having an output member arranged to transmit motion to said driven components; means for moving said element axially with reference to said housing in accordance with a predetermined program; and operating means for effecting movements of said output member in response to axial movements of said element with reference to said housing, including a plurality of valves respectively mounted in said recesses of said housing portions and being selectively actuatable by said actuating means to thereby regulate the flow of the fluid to and from said prime mover.

10. A combination as defined in claim 9, wherein said portions of said housing are mirror symmetrical to each other with reference to said coupling means and said recesses have open ends remote from said coupling means, said housing further comprising cover means for the open ends of said recesses and threaded valve adjusting members supported by said cover means.

11. In a follow-up apparatus for transmitting motion to at least one driven component of a machine tool or the like, a combination comprising a housing provided with at least one fluid discharge outlet and with at least one inlet for admission of pressurized fluid; a motion transmitting element axially movably received in said housing; a fluid-operated prime mover having an output member arranged to transmit motion to said driven component; means for moving said element axially with reference to said housing in accordance with a predetermined program; operating means for effecting movements of said output member in response to axial movements of said element with reference to said housing, including a plurality of valves mounted in said housing and being selectively actuatable by said element to thereby regulate the flow of a fluid to and from said prime mover, said valves including at least one first valve interposed between said inlet and said prime mover and at least one second vlave interposed between said outlet and said prime mover; and pressure regulator means interposed between said second valve and said prime mover.

12. A combination as defined in claim 11, wherein said pressure regulator means is a guage having a cylinder and a spool reciprocably received in said cylinder and defining therewith a flow restricting passage wherein the flow of fluid is throttled on its way from said prime mover to said second valve.

13. A combination as defined in claim 11, wherein said gauge further comprises means for biasing said spool in a direction to reduce the flow restricting action upon the fluid flowing from said prime mover to said second valve.

14. A combination as defined in claim 13, wherein said gauge further comprises a casing for said cylinder, sealing means interposed between said cylinder and said casing, and an abutment for said spool, said abutment being threadedly connected with said casing and being adjacent to an open end of said cylinder, said biasing means being arranged to normally maintain said spool in engagement with said abutment.

15. A combination as defined in claim 13, wherein said spool comprises three axially spaced lands subdividing the interior of said cylinder into a pressure space, a supply space, a return space and a compartment for said biasing means, said passage being disposed between said supply space and said return space.

16. A combination as defined in claim 15, wherein said cylinder has first port means connecting said supply space with said prime mover, second port means communicating with said return space and third port means communicating with said pressure space, said gauge further comprising conduit means connecting said second and third port means, said cylinder further having fourth port means connecting said compartment with said outlet.

17. A combination as defined in claim 16, wherein said second valve has a tubular valve body defining an annular seat and a valve member reciprocable in said valve body and normally sealingly engaging said seat, said valve body having a first space communicating with said conduit means of said gauge and located at one side of said seat and a second space communicating with said outlet and located at the other side of said seat, said conduit means being free to communicate with said second space in response to movement of said valve member from sealing engagement with said seat under the action of said motion transmitting element.

18. A combination as defined in claim 17, further comprising second conduit means connecting said conduit means of said gauge with said first space in said valve body and third conduit means connecting said second space of said valve body with said outlet.

19. A combination as defined in claim 17, wherein said valve member comprises flow restricting means for throttling the flow of fluid from said first space to said second space on movement of said valve member from sealing enegagement with said seat.

20. In a follow-up apparatus for transmitting motion to at least one driven component of a machine tool or the like, a combination comprising a housing; a motion transmitting element axially movably received in said housing; a fluid-operated prime mover having an output member arranged to transmit motion to said driven component; means for moving said element axially with reference to said housing in accordance with a predetermined program; and operating means for effecting movements of said output member in response to axial movements of said element with reference to said housing, including a plurality of valves mounted in said housing and being selectively actuatable by said element to thereby regulate the flow of a fluid to and from said prime mover, each of said valves comprising a hollow body defining a seat, a valve member reciprocably received in said body and having a conical sealing surface; spring means for biasing said surface into sealing engagement with said seat, and axially guided pin-shaped follower means for displacing said valve member against the opposition of said spring means in response to axial movement of said element in a predetermined direction, each of said bodies defining two spaces located at the opposite sides of the respective seat and said valve members being provided with bores which establish communication between such spaces in the corresponding bodies.

21. A combination as defined in claim 20, further comprising a safety device for influencing the operation of said means for moving said element axially in response to predetermined axial displacements of said element with reference to said housing.

22. A combination as defined in claim 21, wherein said safety device comprises a first electric switch which is actuated in response to a predetermined axial movement of said element in a first direction and a second electric switch which is actuated in response to predetermined axial movement of said element in a second direction counter to said first direction.

23. A combination as defined in claim 22, wherein said element comprises actuating means which shares the axial movements thereof and is arranged to actuate said valves, said actuating means being further arranged to actuate said switches.

24. A combination as defined in claim 23, wherein said actuating means comprises cam means and further comprising trip means movably mounted in said housing to actuate said switches in response to displacement by said cam means when said element completes said predetermined axial movements in the respective directions.

25. A combination as defined in claim 24, wherein said cam means comprises two discrete can faces, one for each of said switches, and said cam faces are arranged to move the respective trip means substantially at right angles to the axis of said element.

26. A combination as defined in claim 23, wherein said actuating means has a neutral position in which said valves are closed and said switches are located without said housing, said housing being provided with first and second trip means for said first and second switches, one of said trip means being arranged to actuate the respective switch in response to movement of said actuating means to one side of said neutral position and the other trip means being arranged to actuate the respective switch in response to movement of said actuating means to the other side of said neutral position.

* * * * *